(12) United States Patent
Cai et al.

(10) Patent No.: US 8,265,639 B2
(45) Date of Patent: Sep. 11, 2012

(54) SYSTEM AND METHOD FOR MODULATION SCHEME CHANGES

(75) Inventors: Zhijun Cai, Euless, TX (US); Sean Bartholomew Simmons, Waterloo (CA); James Earl Womack, Bedford, TX (US); Takashi Suzuki, Ichikawa (JP); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 748 days.

(21) Appl. No.: 12/341,956

(22) Filed: Dec. 22, 2008

(65) Prior Publication Data

US 2009/0170509 A1  Jul. 2, 2009

Related U.S. Application Data

(60) Provisional application No. 61/016,646, filed on Dec. 26, 2007.

(51) Int. Cl.
*H04W 72/00* (2009.01)

(52) U.S. Cl. ............. 455/450; 455/452.2; 455/452.1; 455/434; 455/422.1; 370/329; 370/341; 370/254; 370/389

(58) Field of Classification Search ............ 455/450, 455/452.2, 452.1, 434, 422.1; 370/329, 341, 370/254, 389, 312, 320, 335, 340, 342

See application file for complete search history.

(56) References Cited

U.S. PATENT DOCUMENTS

| 7,869,402 | B2* | 1/2011 | Yoon et al. | 370/329 |
|---|---|---|---|---|
| 7,961,680 | B2* | 6/2011 | Park et al. | 370/329 |
| 7,961,695 | B2* | 6/2011 | Fukuoka et al. | 370/342 |
| 8,054,767 | B2* | 11/2011 | Choi et al. | 370/280 |
| 8,059,632 | B2* | 11/2011 | Xu | 370/352 |
| 8,165,085 | B2* | 4/2012 | Nishio et al. | 370/329 |
| 2006/0008020 | A1 | 1/2006 | Blankenship et al. | |
| 2007/0265016 | A1 | 11/2007 | Kahtava et al. | |
| 2008/0095071 | A1* | 4/2008 | Lu et al. | 370/254 |
| 2010/0040003 | A1* | 2/2010 | Nishio et al. | 370/329 |
| 2010/0290419 | A1* | 11/2010 | Wengerter | 370/329 |
| 2011/0044265 | A1* | 2/2011 | Wang et al. | 370/329 |

FOREIGN PATENT DOCUMENTS

EP  1289181 A1  3/2003

(Continued)

OTHER PUBLICATIONS

KDDI, Category 0 information for TDM based multilexing of L1/L2 control signaling in E-Utra Downlink, 3GPP TSG RAN WG1 metting # 48, St. Louis, USA, Feb. 12-16, 2007.*

(Continued)

*Primary Examiner* — Ajit Patel
*Assistant Examiner* — Khai M Nguyen
(74) *Attorney, Agent, or Firm* — Conley Rose, P.C.; J. Robert Brown, Jr.

(57) ABSTRACT

A system and method are disclosed that allow changes of a modulation and coding scheme (MCS) without overhead signaling. A priori, a network device and a user device know the manner in which the MCS will be changed. In one embodiment, the network device indicates the MCS to be used to decode a second portion of a message in a first portion of the message. In another embodiment, the user device blind detects the MCS used over a sub-set of MCSs.

19 Claims, 12 Drawing Sheets

FOREIGN PATENT DOCUMENTS

EP          1622289 A2      2/2006

OTHER PUBLICATIONS

3GPP TSG RAN WG1 Meeting #48; Category 0 Information for TDM Based Multiplexing of L1/L2 Control Signaling in E-UTRA Downlink; KDDI; R1-070886; St Louis, USA; Feb. 12-16, 2007; 5 pgs.

3GPP TSG RAN WG1 RN47; Feedback Reduction with Incremental MCS Set for LTE; Broadcom Corporation; R1-063241; Riga; Nov. 6-10, 2006; 9 pgs.

3GPP TSG RAN#44; VoIP and HARQ for E-UTRA + TP; Motorola; R1-060698; Denver, USA; Feb. 13-17, 2006; 9 pgs.

PCT Invitation to Pay Additional Fees; PCT Application No. PCT/US2008/088055; Apr. 20, 2009; 5 pgs.

European Examination Report; European Application No. 08867978.2; Apr. 28, 2011; 3 pages.

3GPP TSG GERAN WG1; Incremental Redundancy Using Circular Buffer Rate Matching; Meeting No. 1; AHG1-070015; Motorola, Samsung; Jun. 19-21, 2007; 8 pgs.

PCT International Search Report; U.S. PCT Application No. PCT/US2008/088055; Jun. 4, 2009; 6 pgs.

PCT Written Opinion of the International Searching Authority; U.S. PCT Application No. PCT/US2008/088055; Jun. 4, 2009; 7 pgs.

European Examination Report; Application No. 08867978.2; Sep. 1, 2011; 4 pages.

* cited by examiner

The possible MCS for the current transmission is
N+1, N, N-1 given the prior transmission uses MCS
N. Assume the maximum step size is 1.

SYSTEM AND METHOD FOR MODULATION SCHEME CHANGES

CROSS-REFERENCE TO RELATED APPLICATIONS

The present application claims priority to U.S. Provisional Patent Application No. 61/016,646, filed Dec. 26, 2007, by Zhijun Cai, et al, entitled "System and Method for Modulation Scheme Changes", which is incorporated by reference herein as if reproduced in its entirety.

BACKGROUND

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node-B (eNB) rather than a base station or other systems and devices that are more highly evolved than the equivalent equipment in a traditional wireless telecommunications system. Such advanced or next generation equipment is typically referred to as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. The MBMS may be communicated from an eNB to a UE using point-to-point (PTP) communication or point-to-multipoint (PTM) communication.

In wireless communication systems, transmission from the network access equipment (e.g., eNB) to the UE is referred to as a downlink transmission. Communication from the UE to the network access equipment is referred to as an uplink transmission. Wireless communication systems generally require maintenance of timing synchronization to allow for continued communications. Maintaining uplink synchronization can be problematic, wasting throughput and/or decreasing battery life of an UE given that a UE may not always have data to transmit.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
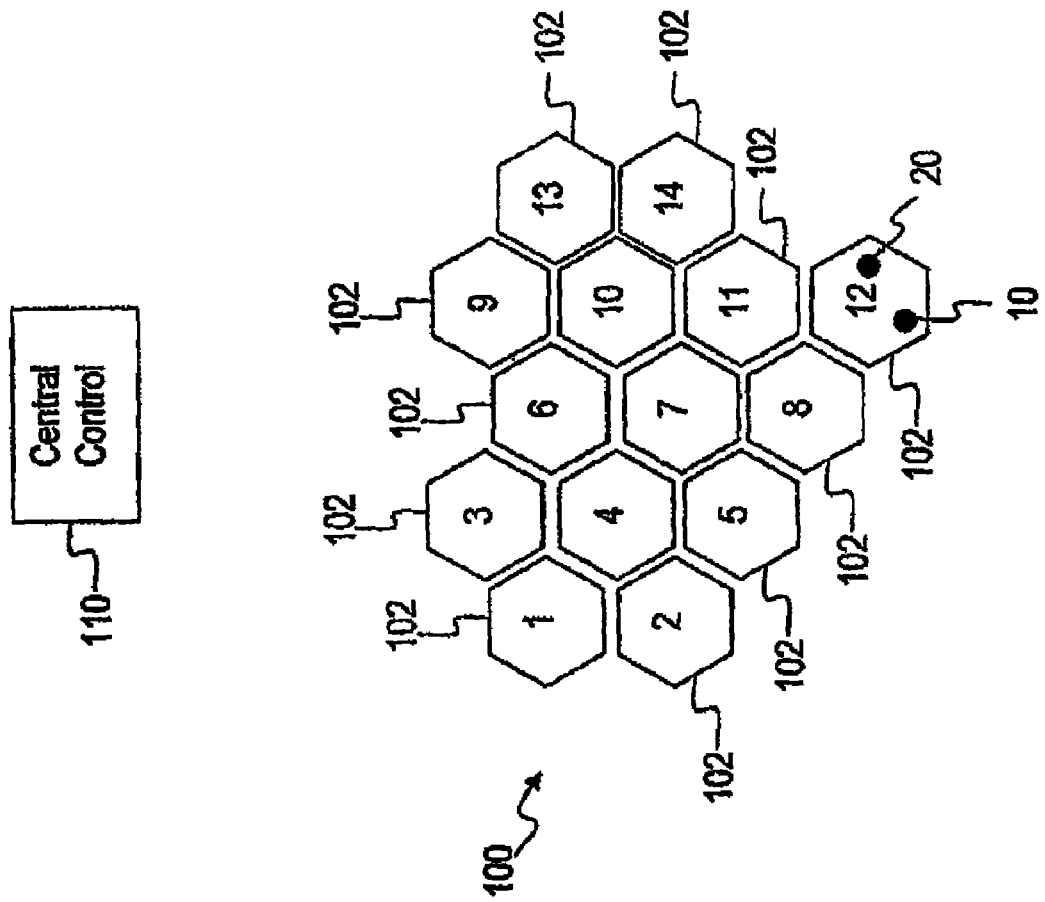
FIG. 1 is an illustration of a cellular network according to an embodiment of the disclosure.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from a network access equipment (e.g., eNB). While the cells 102 are depicted as having non-overlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell $102_{12}$, it should be understood that network access equipment would be present in each of the cells 102. A central control 110 may also be present in the cellular network 100 to oversee some of the wireless data transmissions within the cells 102.

Figure 2:
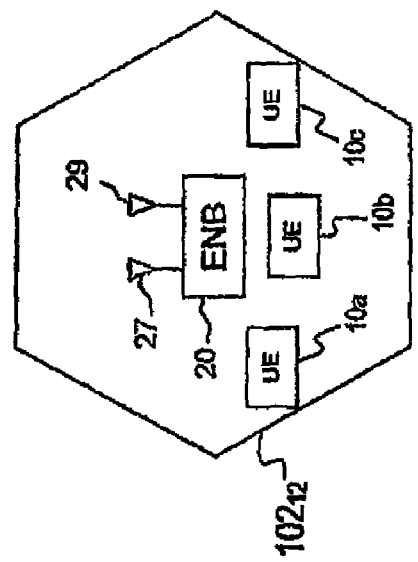
FIG. 2 is an illustration of a cell in a cellular network according to an embodiment of the disclosure.

FIG. 2 depicts a more detailed view of the cell $102_{12}$. The network access equipment 20 in cell $102_{12}$ may promote communication via a transmitter 27, a receiver 29, and/or other well known equipment. Similar equipment might be present in the other cells 102. A plurality of UEs 10 are present in the cell $102_{12}$, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

Wireless communication systems use modulation and coding to compensate for varying channel conditions and payload variances. There are many types of modulation and coding schemes. For example, there is amplitude modulation and phase modulation. There are also different levels of modulation for example 16 QAM (Quadrature Amplitude Modulation) and 64 QAM. Further, there are different types of coding. There are rate ⅓ codes and rate ½ codes. For a rate ⅓ code on average, three coded bits are used to send one information bit, while in a rate ½ code, on average, two coded bits are used to send one information bit. As a result, different modulation and coding schemes will provide for a different amount of raw information data to be sent using the same resource. For example, a rate ½ coding scheme will allow more information bits to be sent over the same time period in the same bandwidth than a rate ⅓ coding scheme, assuming the same modulation scheme is applied with both coding schemes. Further, the use of different modulation schemes will also result in more or less raw information data transmitted depending on the modulation scheme used. The various coding schemes provide redundancy in the data, thus over a noisy channel a more redundant coding scheme may allow the data to be decoded and thus received correctly, while a less redundant coding scheme may be un-decodable over the same channel.

In order for communication from a network access equipment to a UE to be properly received, the network access equipment must encode the data using a modulation and coding scheme (MCS), and the UE must decode the data using the same MCS. This requires that the UE know what MCS to use. In prior art systems, the network access equipment communicates the MCS to the UE via overhead signaling. For example, the network access equipment may communicate the MCS to the UE using the physical downlink control channel (PDCCH).

In semi-persistent scheduled services, e.g., voice over internet protocol (VoIP), some resources are allocated persistently, so that the UE does not incur additional signaling such as scheduling grants, modulation and coding information, etc. However, due to changing channel conditions and payload size variance, it may be desirable to allow the change of the modulation and coding in order to more efficiently utilize the radio resources.

In one embodiment, the UE can blind-detect all possible modulation and coding schemes. That is, the network access equipment can choose which MCS to use, and the UE will attempt to decode a received message using all known MCSs. However, attempting to decode a received message using all known MCSs would increase the processing power and time required by the UE to decode the message. This implementation could also reduce battery life.

Figure 3:
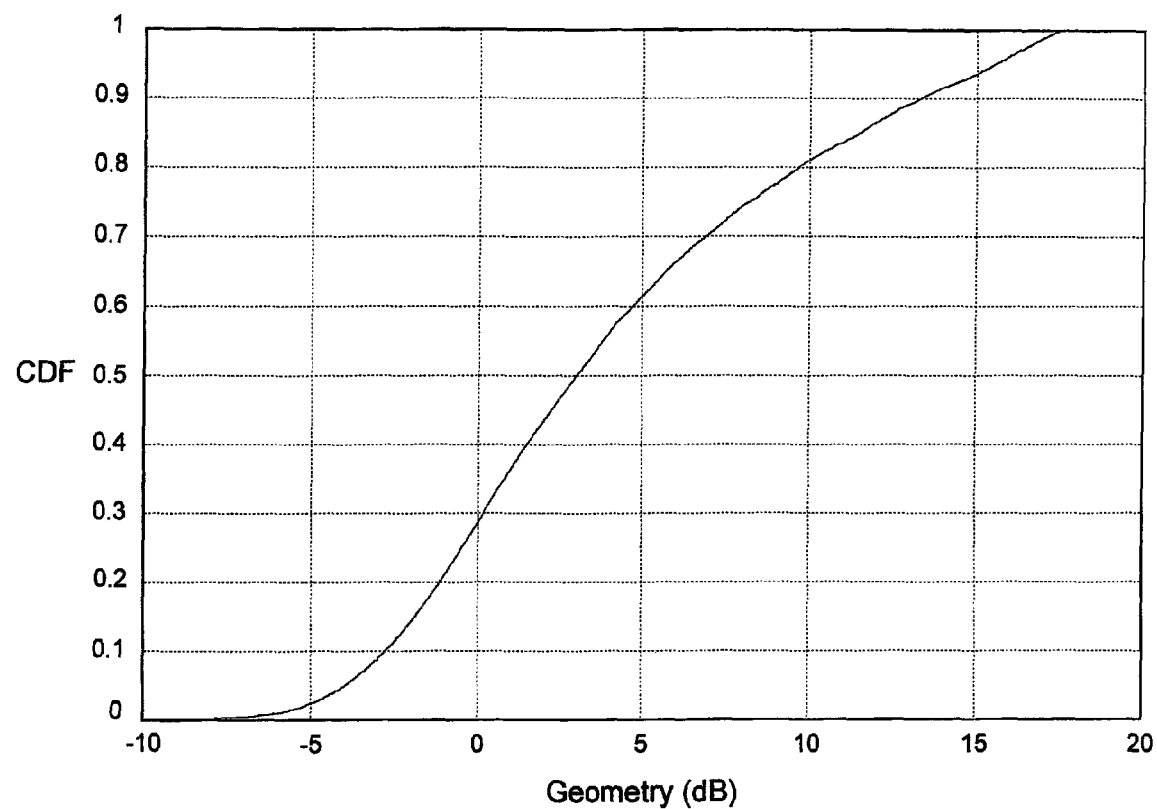
FIG. 3 is the cumulative density function (CDF) of user geometry in a cell.

FIG. 3 is the cumulative density function (CDF) of user geometry in a cell. As can be seen from FIG. 3, the dynamic range of a user's average signal to noise ratio (SNR) is large, e.g., −4.2 dB at 95% coverage (cell edge) and 13 dB at 10% (close to the network access equipment). If users at the cell edge and users close to the network access equipment could use the same modulation and coding scheme, the spectrum efficiency could be reduced. For example, if the same quadrature phase shift key (QPSK) and rate ¼ coding is used for all users, the spectrum efficiency is 0.5 bits/symbol. If the payload is 244 bits, then 488 symbols are required for the transmission. This may be suitable for the cell edge user case (e.g., low geometry case). However, if the same MCS is used for the users close to the network access equipment (e.g., the high geometry case), then significant resources are wasted. For the 10th percentile users, 16-quadrature amplitude modulation (16-QAM) and ¾ coding may be used, which provides 3 bits/symbol. Thus, only 82 symbols are required to transmit the 244 bit payload. This provides a factor of 6 times savings. Additionally, if 64-QAM is utilized, additional savings are achieved. These savings are even more pronounced on the uplink due to the lack of quick resource control from the network access equipment.

In some communications systems, it may not be necessary to rapidly change the MCS. The hybrid automatic repeat request (HARQ) can compensate for most of the fast fading effects so there is little need for fast AMC (Adaptive Modulation and Coding) based on a channel quality indictor (CQI) to deal with the small near-constant size payload. By not rapidly changing the MCS, the associated VoIP overhead can be reduced and the battery life of the UE can be conserved. However, the UE may need to slowly change its MCS based on the average SNR (e.g., moving from cell center to cell edge) or codec rate changes (e.g., 12.2 k changes to 4.8 k). Some of these changes may also affect the scheduled resource size (e.g., number of resource blocks (RBs)) and position of the resources in the sub-frames.

Figure 4:
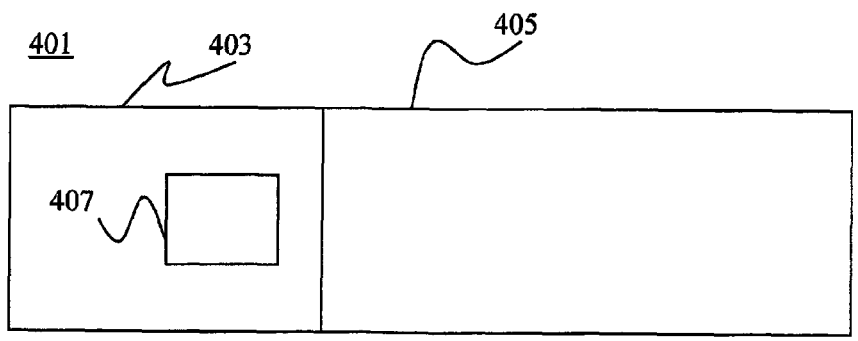
FIG. 4 is an illustrative block diagram of a message in accordance with one embodiment of the present invention.

As shown in FIG. 4, in one embodiment, a network access equipment indicates to a UE a new MCS using a message 401 divided into a first portion 403 and a second portion 405. In one implementation, the first portion 403 could be header bits; however, other portions of the message could be used as well. The first portion 403 is encoded with a MCS known both to the network access equipment and to the UE. The UE can decode the first portion without having to blind-detect the MCS. The first portion 403 provides instructions 407 to the UE of a MCS to use to decode the second portion 405. The network access equipment encodes the second portion 405 with the MCS that was provided in the first portion 403. The network access equipment then sends the message.

Figure 5:
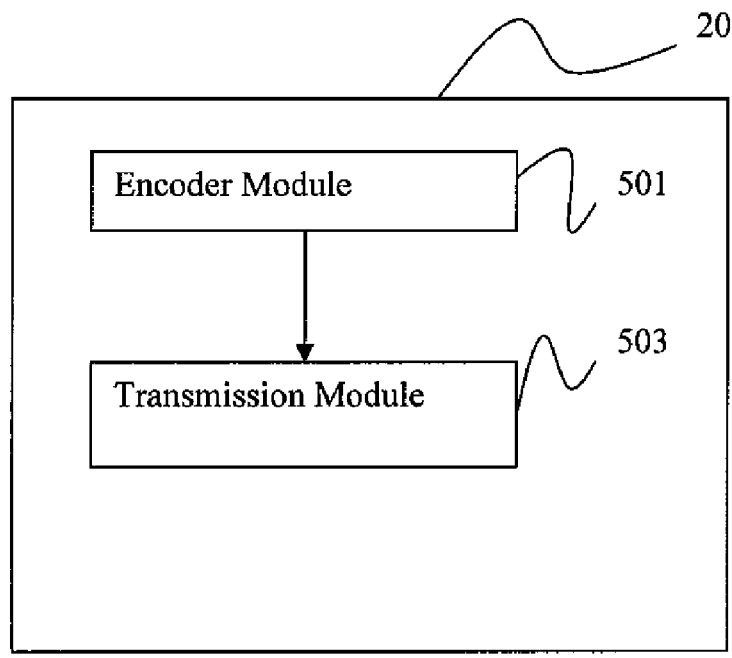
FIG. 5 is an illustrative block diagram of a network access equipment.
Figure 7:
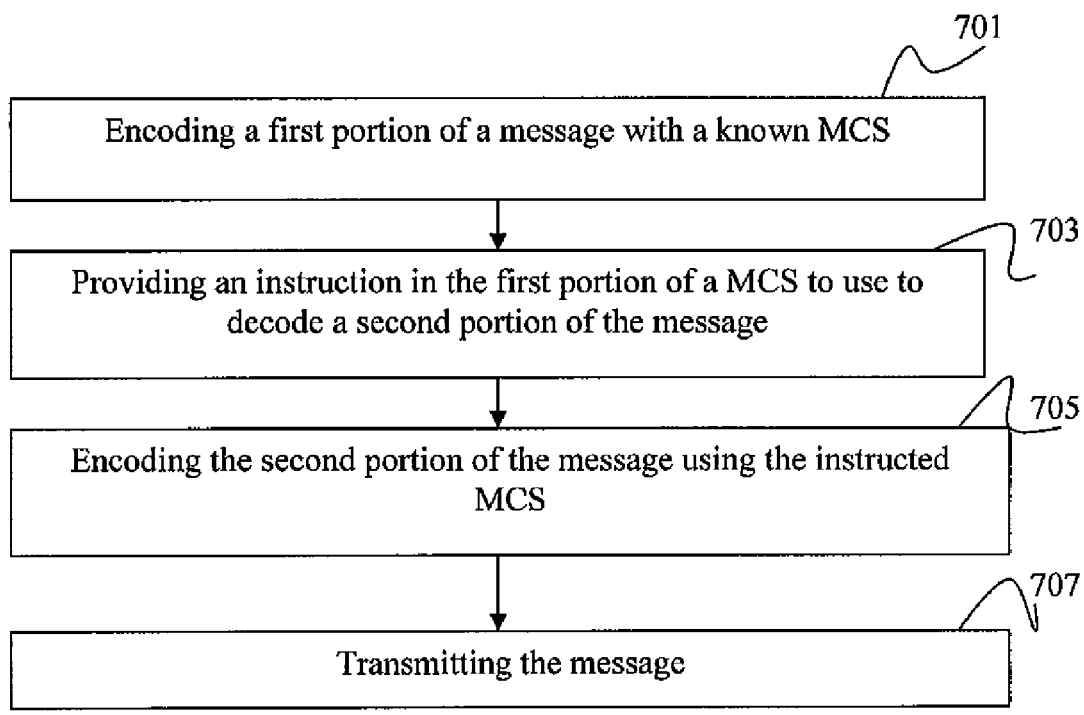
FIG. 7 is a flow chart corresponding to one network access equipment embodiment.

FIG. 5 illustrates modules within the network access equipment. These modules are for illustrative purposes and may be stored in any memory or processor within the network access equipment. Additionally, these modules may be implemented in software, hardware or firmware. Within the network access equipment 20, is an encoder module 501 and a transmission module 503. These modules will be discussed in conjunction to the method flow diagram shown in FIG. 7. The encoder module 501, at block 701, encodes a first portion of the message 403 using a known MCS. Then at block 703, the encoder module 501 provides an instruction 407 in the first portion 403 of a MCS to use to decode the second portion 405. At block 705, the encoder module 501 encodes the second portion of the message 405 using the instructed MCS. The encoder module 501 then sends the message to the transmission module 503. At block 707, the transmission module sends the message.

Figure 6:
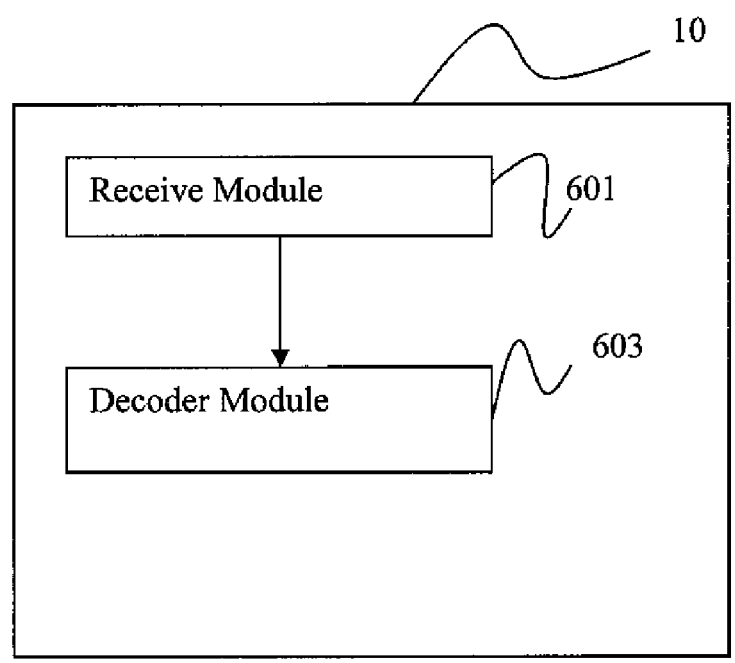
FIG. 6 is an illustrative block diagram of a user equipment.
Figure 8:
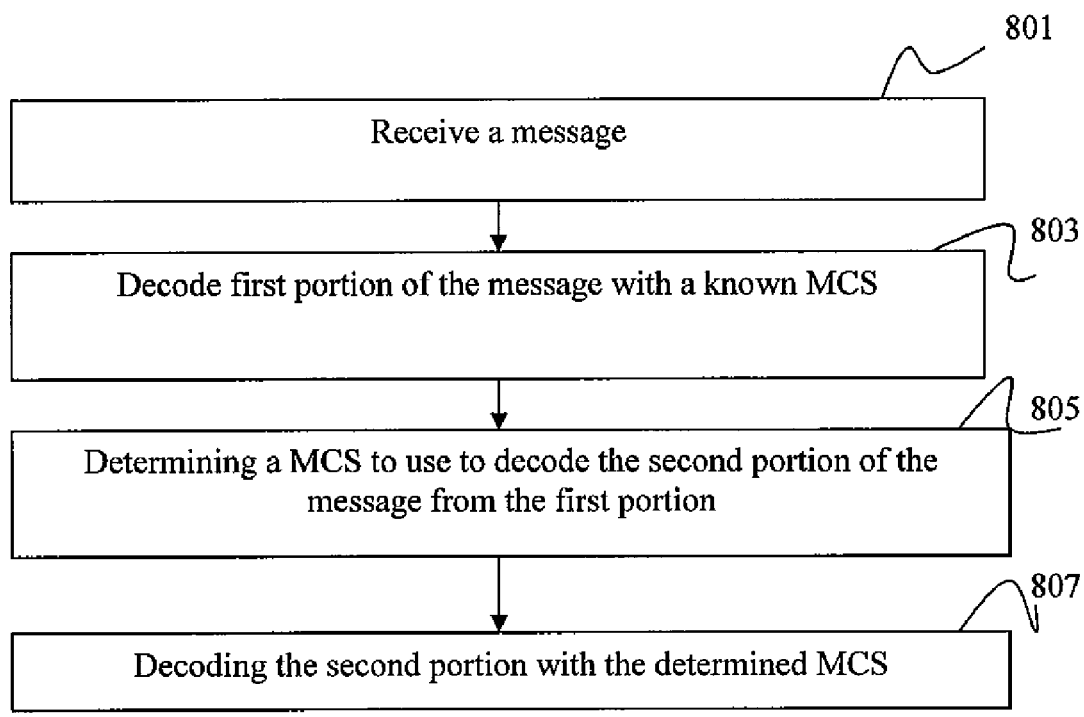
FIG. 8 is a flow chart corresponding to a user equipment embodiment.

FIG. 6 illustrates modules within the UE 10. These modules are for illustrative purposes and may be stored in any memory or processor within the UE. Additionally, these modules may be implemented in software, hardware or firmware. The UE 10 includes a receiver module 601 and a decoder module 603. These modules will be discussed in conjunction with the method flow diagram shown in FIG. 8. At block 801, the receiver module 601 receives the encoded message. Then the receiver module 601 passes the message to the decoder module 603. At block 803, the decoder module 603 decodes the first portion 403 using the known MCS. At block 805, the decoder module 603 then retrieves the instructed MCS 407 from the first portion 403 to use to decode the second portion 405. At block 807, the decoder module 603 decodes the second portion 405 of the message using the instructed MCS 407. In some implementations, additional resource blocks for transmission may be necessary with the change in MCS. In those implementations, the first portion 403 will also indicate where in the transmission the user equipment can find the additional resource blocks for concatenation.

Figure 9:
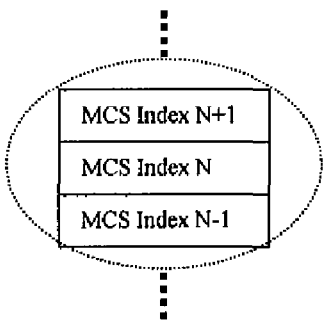
FIG. 9 is an illustration of an MCS choice scheme.

In another embodiment, the network access equipment may only change the MCS within a certain range of MCSs. As shown in FIG. 9, the network access equipment can only use a MCS that is within one increment of the previously used MCS. For example, assume in subframe N that the network access equipment transmits the voice data to the UE using a MCS index 17; then in the subframe N+20 (e.g., the next Voice frame transmission (20 ms apart), and each subframe is 1 ms), the network access equipment can only select the MCS 16 (i.e., 17−1), MCS 17, or MCS 18 (i.e., 17+1). The UE will begin by decoding the voice packet with the previous MCS (i.e., 17). If the UE cannot decode the transmission using MCS 17, the UE will try either MCS 16 or 18. As an example, the UE might use MCS 18. If the UE still cannot decode the transmission, the UE will use the other MCS, in this example MCS 16. If the UE is unable to decode the transmission using MCS 16, MCS 17, or MCS 18, then the UE will send a negative acknowledgement (NACK) on the uplink. One skilled in the art will appreciate that the foregoing example uses an increment value of 1. However, other increment values can be used. For example, if an increment value of two is chosen, the possible MCS values would be MCS 15, 16, 17, 18 and 19.

Using an increment value may reduce the UE's blind detection range and allow the MCS to gradually change in a larger dynamic range without incurring any additional reconfiguration signaling. The limited dynamic range (e.g., the maximum MCS steps that the transmitter can change in consecutive transmissions) may be signaled to the UE at the call setup stage for both the uplink and downlink. Therefore, the receiver will blindly detect in a very small MCS range based on the agreed rule continuously.

Figure 10:
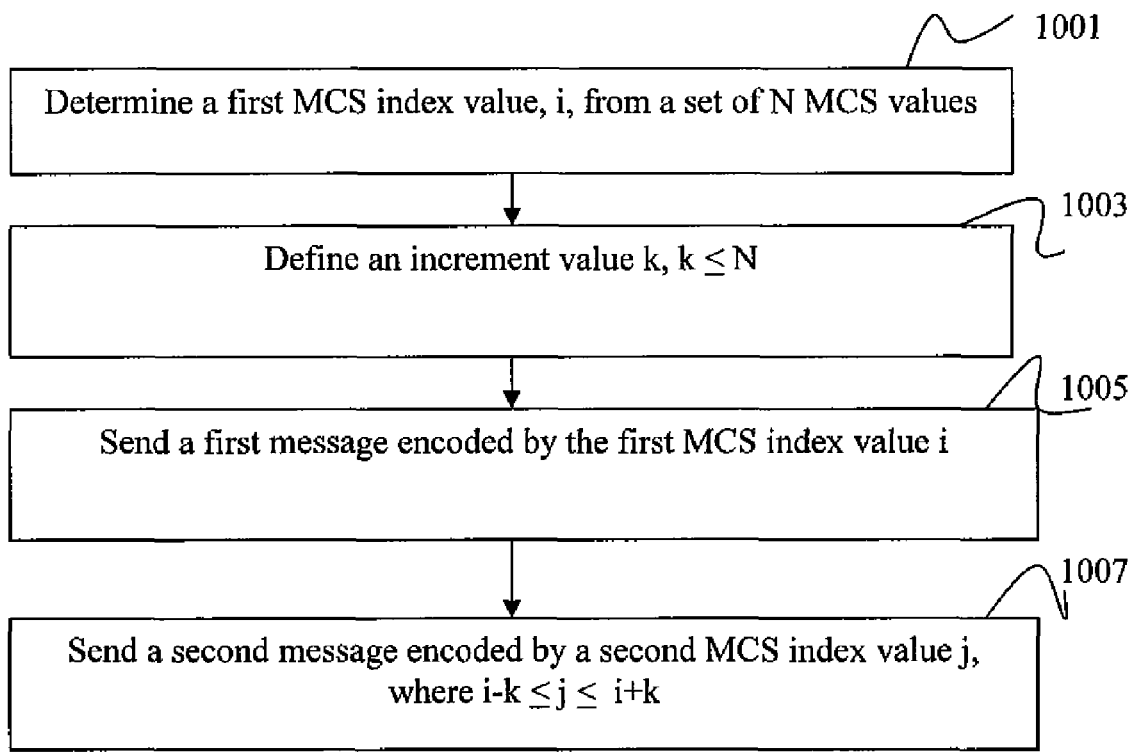
FIG. 10 is a flow chart corresponding to another aspect of a network access equipment embodiment.
Figure 11:
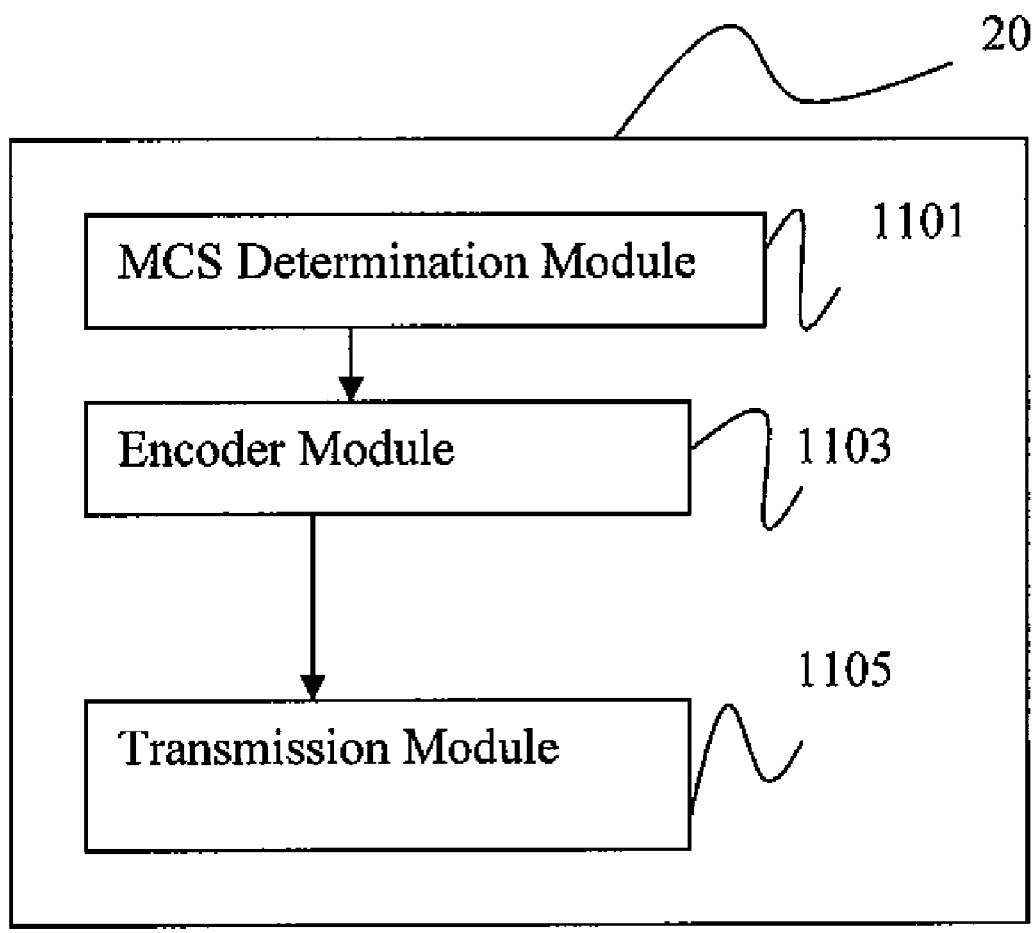
FIG. 11 is an illustrative block diagram of a network access equipment.

FIG. 10 illustrates a method flow diagram for a network access equipment where the change in MCS can only be within a range of certain MCSs. FIG. 11 illustrates modules that could be used to implement the method flow diagram. These modules are for illustrative purposes and may be stored in any memory or processor within the network access equipment. Additionally, these modules may be implemented in software, hardware or firmware. Within the network access equipment 20 is a MCS determination module 1101, an encoder module 1103 and a transmission module 1105. The description of these modules will be done in conjunction with the method flow diagram of FIG. 10.

At block 1001, the MCS determination module 1101 determines a first MCS index, i, from a first set of N MCS values. At block 1003, the MCS determination module 1103 defines an increment value k, where $k \leq N$. At block 1005, the transmission module 1105 sends a first message encoded by the encoder module 1103 with the first MCS index value, i, received from the MCS determination module 1101. Then at block 1007, the transmission module 1105 sends a second message encoded by the encoder module 1103 using a second MCS index value j, received from the MCS determination module 1101, wherein $i-k \leq j \leq i+k$.

Figure 12:
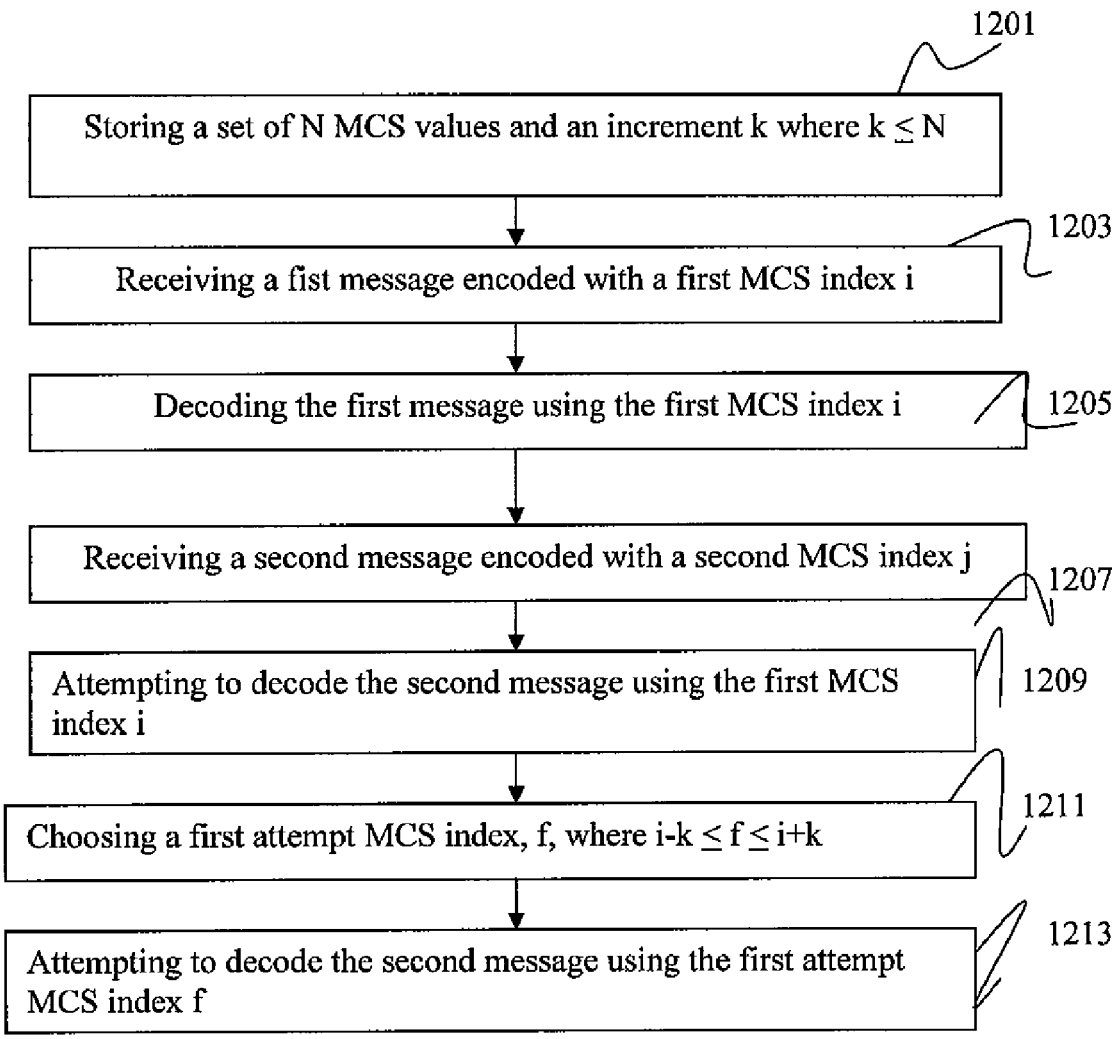
FIG. 12 is a flow chart corresponding to another aspect of a user equipment embodiment.

FIG. 12 illustrates a method flow diagram for a UE where the change in MCS can only be within a range of certain MCSs. At block 1201, the UE stores a set of N MCS values and increment value k, where $k \leq N$. At block 1203, a receive module 601 (shown in FIG. 6), receives a first message encoded with a first MCS index i. At block 1205, decoder module 603 decodes the first message using the first MCS index i. At block 1207, the receiver module 601 receives a second message encoded using a MCS index value j. At block 1209, the decoder module 603 attempts to decode the second message using a first MCS index i. At block 1211, the decoder module 603 chooses a first attempt MCS index, f, where $i-k \leq f \leq i+k$. At block 1213, the decoder module attempts to decode the second message using the first attempt index f. If the decode fails, the decoder module will choose an additional attempt index until all the attempt indexes are exhausted. If the decoder still cannot decode the message, in some embodiments, the UE will send a message back to the network access equipment indicating that the UE was unable to determine the proper MCS to decode the message.

In another embodiment, the network access equipment slowly changes the blind decoding configuration set when certain events occur (e.g., only when the UE's geometry is largely changed or the codec's rate is changed). Otherwise, the network access equipment will keep the blind decoding configuration set unchanged. The network access equipment may detect the variation of channel condition by UE sending CQI in a slow manner.

In one implementation, at the beginning of call set up, the network access equipment notifies the UE about the indexes for various blind decoding configuration sets by radio resource control (RRC) signaling (e.g., total 3 blind detection configuration set, indexed set 1, set 2, and set 3). In one implementation, set 1 may comprise three MCSs, e.g., 1, 3 and 5. Set 2 may comprise three different MCSs, e.g., 2, 6, and 7, while set 3 may comprise another three MCSs, e.g., 3, 4, and 6. Thus, the network access equipment signals to the UE that there are three different blind detection configuration sets. The network access equipment also signals to the UE which set to use initially. The UE will then blind detect a transmission received from the network access equipment using only the MCSs in the signaled set. Thus, if the network access equipment signals to the UE to use set 1, the UE will blind detect the transmission using MCSs 1, 3 and 5.

In one implementation, when an event trigger occurs (e.g., when the UE's geometry sufficiently changes), a media access control (MAC) packet data unit (PDU) is generated to re-configure the blind decoding configuration set by only including the set index. Thus, for example, the network access equipment may generate a signal to the UE containing the index number 2. This index number 2 will indicate to the UE that the network access equipment will now be using MCSs 2, 6 and 7. In some embodiments, a start time of when the network access equipment will begin to use the second blind detection configuration set is included in the signaling message. This start time may be an absolute start time (i.e., a frame count indication), or it may be a relative start time (i.e., providing a countdown/count-up timer). An absolute start time will be independent of when the signaling message is received at the user equipment, while a relative start time is dependent upon when the signaling message is received.

Figure 13:
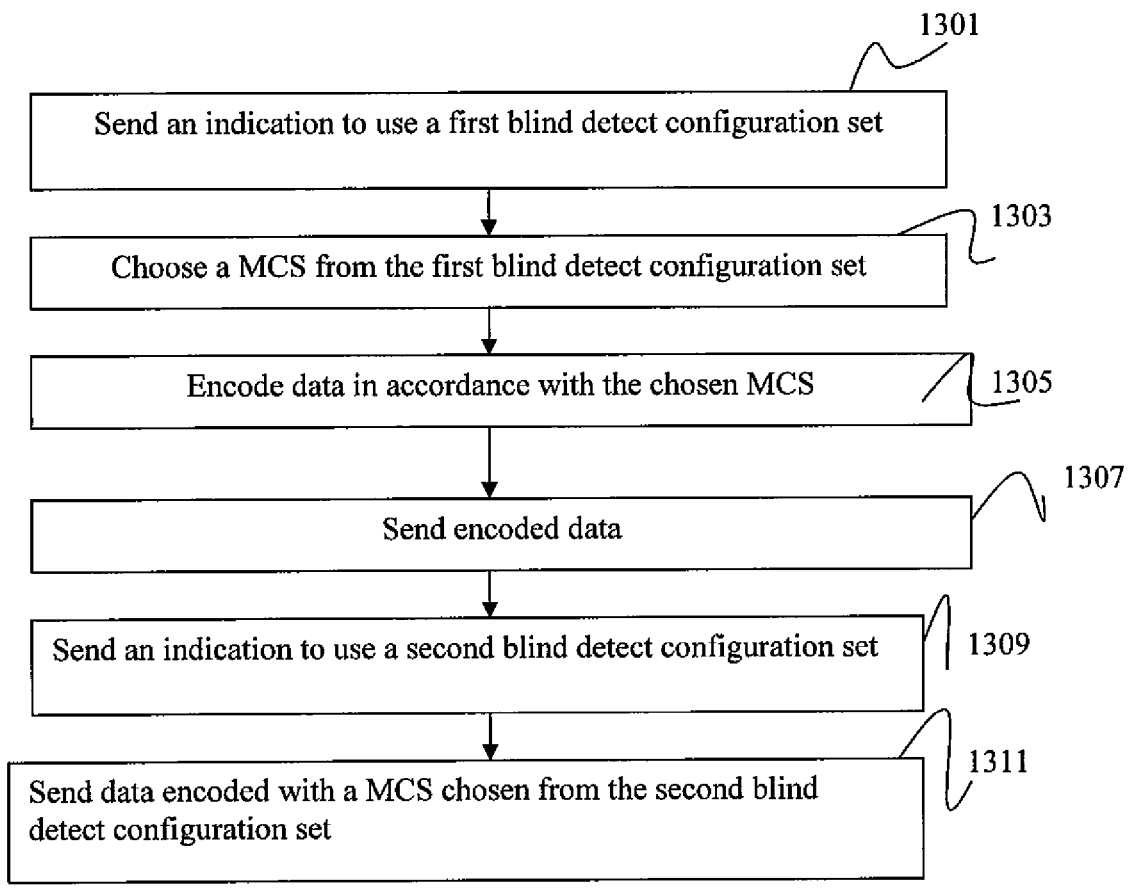
FIG. 13 is a flow chart corresponding to another aspect of a network access equipment embodiment.

FIG. 13 illustrates a method flow diagram of one embodiment of the network access equipment. At block 1301, the transmission module 1105 (shown in FIG. 11) sends an indication to use a first blind detection configuration set. At block 1303, the MCS determination module 1103 chooses a MCS from the first blind detection configuration set. At block 1305, the encoder module 1103 encodes the data in accordance with the chosen MCS from the first blind detection configuration set. At block 1307, the transmission module 1105 sends the encoded data. At block 1309, the transmission module 1105 sends an indication to use a second blind detection configuration set. In one embodiment, the MCS determination module 1101 receives an indication that a new MCS is desired and chooses the second blind detection configuration set. At block 1311, the transmission module 1105 sends data encoded with a MCS chosen from the second blind detection configuration set.

In one implementation, the blind detection configuration set size is only one (i.e., only one MCS is included in the set). The network access equipment slowly changes the MCS when certain events occur (e.g., only when the UE's geometry changes or the codec's rate is changed). Otherwise, the network access equipment will keep the MCS unchanged. Whenever the MCS changes, the network access equipment notifies the UE about the change via RRC signaling. In this implementation, the MCS is not sent for each data packet, but is only sent when a change is to occur.

Figure 14:
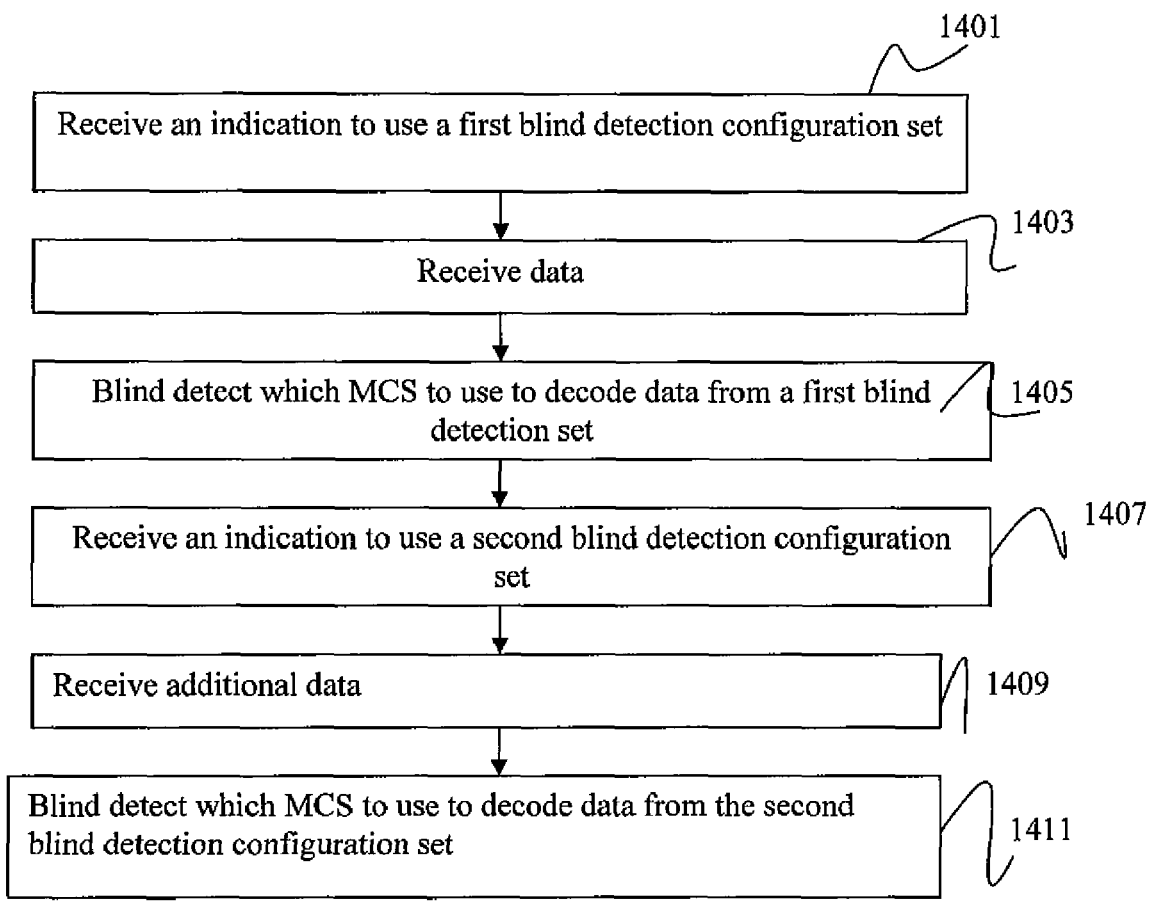
FIG. 14 is a flow chart corresponding to another aspect of a user equipment embodiment.

FIG. 14 illustrates a method flow diagram of one embodiment of the UE. At block 1401, the receive module 601 (shown in FIG. 6) receives an indication to use a first blind detection configuration set. At block 1403, the receive module 601 receives data. At block 1405, the decoder module 603 blind detects which MCS to use to decode the received data from the first blind detection configuration set. At block 1407, the receive module 601, receives an indication to use a second blind detection configuration set. At block 1409, the receive module 601 receives additional data. At block 1411, the decoder module 603 blind detects which MCS to use to decode the additional received data from the second blind detection configuration set.

Figure 15:
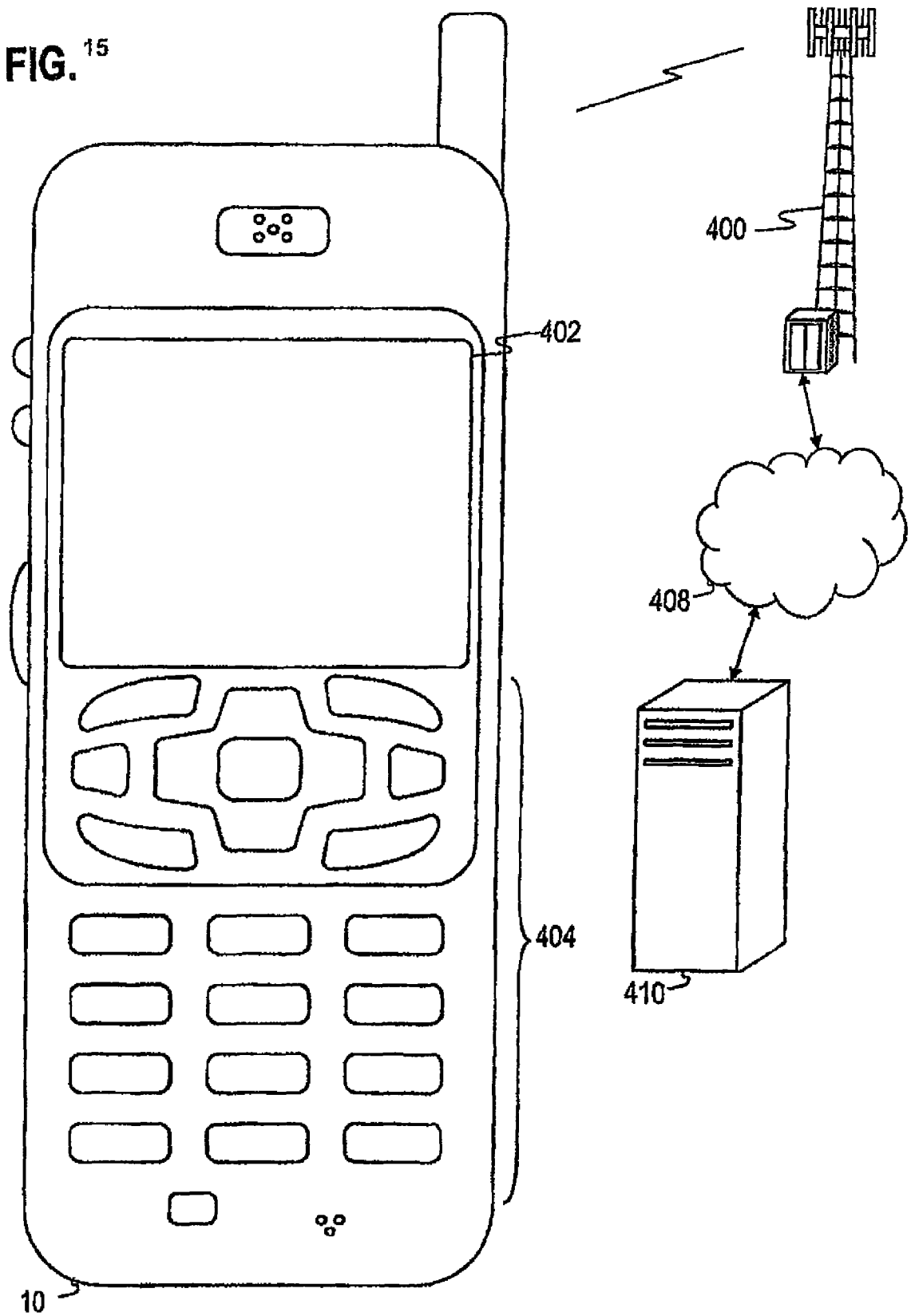
FIG. 15 is a diagram of a wireless communications system including a mobile device operable for some of the various embodiments of the disclosure.

FIG. 15 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 16:
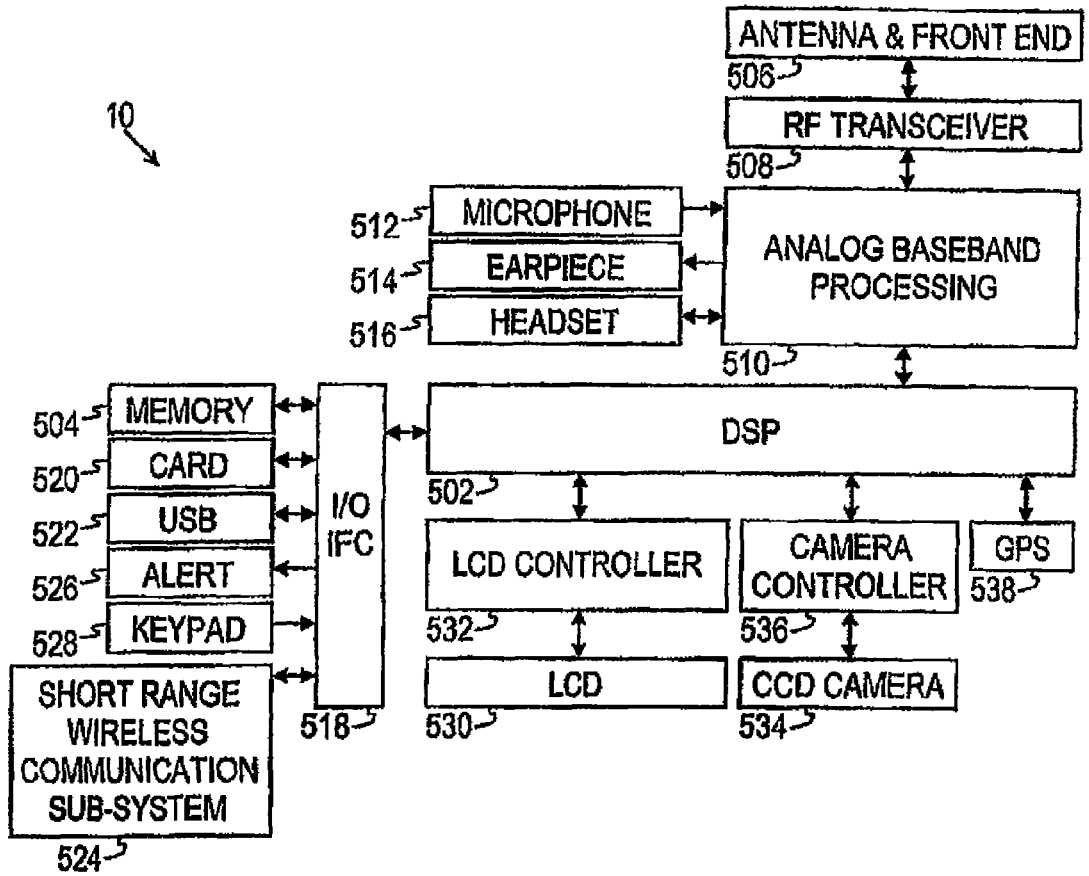
FIG. 16 is a block diagram of a mobile device operable for some of the various embodiments of the disclosure.

FIG. 16 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 17:
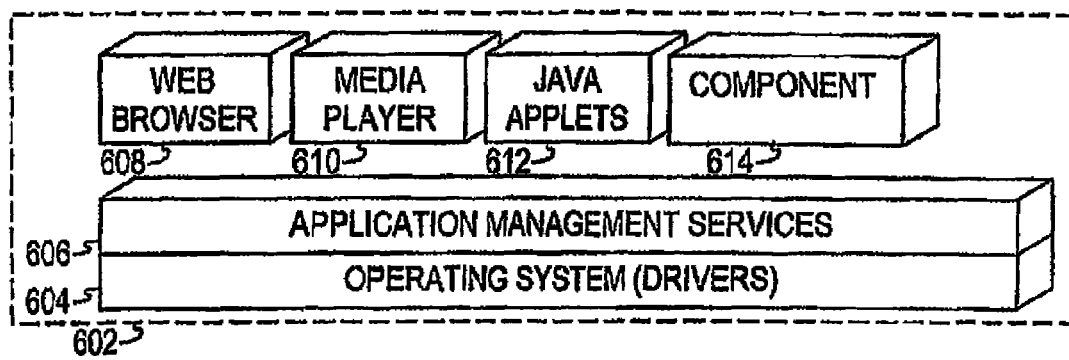
FIG. 17 is a diagram of a software environment that may be implemented on a mobile device operable for some of the various embodiments of the disclosure.

FIG. 17 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 17 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 18:
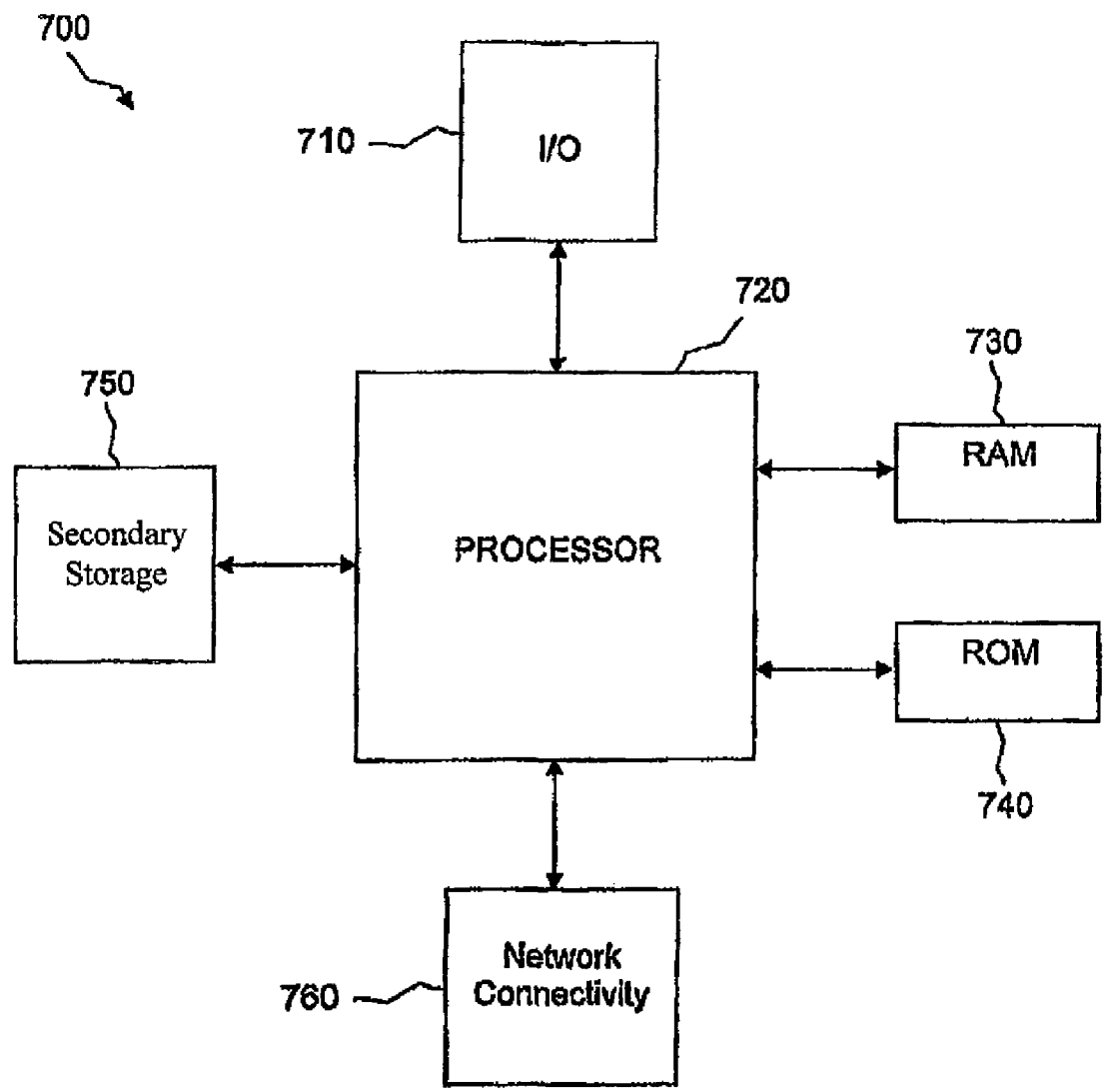
FIG. 18 is an exemplary general purpose computer according to one embodiment of the present disclosure.

The UEs 10, eNBs 20, and central control 110 of FIG. 1 and other components that might be associated with the cells 102 may include any general-purpose computer with sufficient processing power, memory resources, and network throughput capability to handle the necessary workload placed upon it. FIG. 18 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 700, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 700 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of indicating a change in modulation and coding schemes (MCSs) at a network comprising:
    sending an indication to a user equipment to use a first blind detection configuration MCS set;
    choosing a MCS from the first blind detection configuration set;
    encoding data in accordance with the chosen MCS;

sending the encoded data;
sending an indication to use a second blind detection configuration set; and
sending data encoded with a MCS chosen from the second blind detection configuration MCS set, wherein thereafter, the network avoids sending additional blind MCS configuration sets and other MCS signalling.

2. The method of claim 1, wherein the first and second blind configuration sets each contain a single MCS.

3. The method of claim 1, further comprising sending the first and second blind detection configuration sets via one of:
RRC signaling; and
a physical downlink control channel.

4. The method of claim 1, wherein sending the indication to use the second blind detection configuration further comprises sending the indication via a MAC control PDU.

5. The method of claim 1, further comprising receiving an indication that a second blind detection configuration set is needed.

6. The method of claim 5, wherein the receiving an indication that a second blind detection configuration is needed comprises receiving an indication that a user equipment's geometry in relation to a network access device has changed.

7. A method of indicating a change in modulation and coding schemes (MCSs) at a user equipment comprising:
receiving an indication to use a first blind detection configuration set;
receiving data;
blind detecting which MCS to use to decode the data from the first blind detection configuration set;
receiving an indication to use a second blind detection configuration set;
receiving additional data; and
blind detecting which MCS to use to decode the data from the second blind detection configuration set, wherein signaling of additional MCS signaling is avoided thereafter.

8. The method of claim 7, wherein the first and second blind detection configuration sets each contain a single MCS.

9. The method of claim 7, further comprising receiving the first and second blind detection configuration sets via one of:
RRC signaling; and
a physical downlink control channel.

10. The method of claim 7, wherein receiving an indication to use the first or second blind detection configuration sets further comprises receiving the indications via a MAC Control PDU.

11. A network device comprising:
a transmission module configured to send an indication to a user equipment to use a first blind detection configuration set;
a modulation coding scheme (MCS) module configured to choose a MCS from the first blind detection configuration set;
the MCS module further configured to encode data in accordance with the chosen MCS;
the transmission module further configured to send the encoded data;
the transmission module further configured to send an indication to use a second blind detection configuration set; and
the transmission module further configured to send data encoded with a MCS chosen from the second blind detection configuration set, wherein the transmission module is further configured to avoid sending further MCS signaling thereafter.

12. The device of claim 11, wherein the first and second blind configuration sets each contain a single MCS.

13. The device of claim 11, wherein the transmission module is further configured to send the first and second blind detection configuration sets via one of:
RRC signaling; and
a physical downlink control channel.

14. The device of claim 11, wherein the transmission module is further configured to send the indication via a MAC control PDU.

15. The device of claim 11, wherein the MCS determination module is further configured to receive an indication that a second blind detection configuration set is needed.

16. A user equipment comprising:
a receive module configured to receive an indication to use a first blind detection configuration set;
the receive module further configured to receive data;
a decoder module configured to blind detect which modulation and coding scheme (MCS) to use to decode the data from the first blind detection configuration set;
the receive module further configured to receive an indication to use a second blind detection configuration set;
the receive module further configured to receive additional data; and
the decoder module further configured to blind detect which MCS to use to decode the data from the second blind detection configuration set, wherein the decoder module blind detects which MCS to use to decode the data from the second blind detection configuration set without receiving further MCS signaling.

17. The user equipment of claim 16, wherein the first and second blind detection configuration sets each contain a single MCS.

18. The user equipment of claim 16, wherein the receive module is configured to receive the first and second blind detection configuration sets via one of:
RRC signaling; and
a physical downlink control channel.

19. The user equipment of claim 16, wherein the receive module is configured to receive the indications via a MAC Control PDU.

* * * * *